United States Patent
Ding et al.

(10) Patent No.: US 11,561,448 B2
(45) Date of Patent: Jan. 24, 2023

(54) FRONT PLATE LAMINATE STRUCTURE AND COLOR ELECTROPHORETIC DISPLAY HAVING THE SAME

(71) Applicant: E Ink Holdings Inc., Hsinchu (TW)

(72) Inventors: Jau-Min Ding, Hsinchu (TW); Po-Yuan Lo, Hsinchu (TW); Sheng-Long Lin, Hsinchu (TW); Ian French, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/355,201

(22) Filed: Jun. 23, 2021

(65) Prior Publication Data

US 2022/0082895 A1 Mar. 17, 2022

Related U.S. Application Data

(60) Provisional application No. 63/076,950, filed on Sep. 11, 2020.

(51) Int. Cl.
*G02F 1/167* (2019.01)
*G02F 1/1333* (2006.01)
*G02F 1/1335* (2006.01)

(52) U.S. Cl.
CPC .......... *G02F 1/167* (2013.01); *G02F 1/13332* (2021.01); *G02F 1/133514* (2013.01)

(58) Field of Classification Search
CPC .. G02F 1/1677; G02F 1/1675; G02F 1/13332; G02F 1/133514; G02F 1/167
See application file for complete search history.

(56) References Cited

U.S. PATENT DOCUMENTS

| | | |
|---|---|---|
| 7,513,813 B2 | 4/2009 | Paolini, Jr. et al. |
| 7,791,782 B2 | 9/2010 | Paolini, Jr. et al. |
| 7,839,564 B2 | 11/2010 | Whitesides et al. |
| 8,098,418 B2 | 1/2012 | Paolini, Jr. et al. |
| 8,363,299 B2 | 1/2013 | Paolini, Jr. et al. |
| 8,441,716 B2 | 5/2013 | Paolini, Jr. et al. |
| 8,576,470 B2 | 11/2013 | Paolini, Jr. et al. |
| 8,830,553 B2 | 9/2014 | Patry et al. |
| 9,075,280 B2 | 7/2015 | Whitesides et al. |
| 9,182,646 B2 | 11/2015 | Paolini, Jr. et al. |

(Continued)

FOREIGN PATENT DOCUMENTS

| | | | |
|---|---|---|---|
| JP | 2010127985 A | * | 6/2010 |
| JP | 2012042794 A | * | 3/2012 |

(Continued)

OTHER PUBLICATIONS

Corresponding Taiwan office action dated Jan. 26, 2022.

*Primary Examiner* — Hoan C Nguyen
(74) *Attorney, Agent, or Firm* — CKC & Partners Co., LLC

(57) ABSTRACT

A front plate laminate structure includes a display medium layer, a top adhesive layer, a transparent substrate, a transparent conductive film, and a color filter layer. The top adhesive layer is located on the display medium layer. The transparent substrate is located on the top adhesive layer. The transparent conductive film is located between the transparent substrate and the top adhesive layer. The transparent conductive film includes a bottom surface facing the top adhesive layer. The color filter layer is located between the transparent substrate and the display medium layer.

12 Claims, 8 Drawing Sheets

(56) References Cited

U.S. PATENT DOCUMENTS

| | | | |
|---|---|---|---|
| 9,195,111 B2 | 11/2015 | Anseth et al. | |
| 9,436,056 B2 | 9/2016 | Paolini, Jr. et al. | |
| 9,470,950 B2 | 10/2016 | Paolini, Jr. et al. | |
| 2009/0109522 A1 | 4/2009 | Paolini, Jr. et al. | |
| 2012/0218622 A1* | 8/2012 | Bae | G02F 1/1677 359/296 |
| 2012/0236391 A1* | 9/2012 | Miyamoto | G02F 1/23 445/24 |
| 2013/0242378 A1 | 9/2013 | Paolini, Jr. et al. | |
| 2014/0185128 A1* | 7/2014 | Lo | G02F 1/1679 445/25 |
| 2014/0362131 A1 | 12/2014 | Paolini, Jr. et al. | |
| 2015/0309385 A1* | 10/2015 | Shu | G02B 5/201 359/296 |
| 2020/0183248 A1 | 6/2020 | Adams et al. | |

FOREIGN PATENT DOCUMENTS

| | | |
|---|---|---|
| TW | 201809845 A | 3/2018 |
| TW | 202032229 A | 9/2020 |

\* cited by examiner

FRONT PLATE LAMINATE STRUCTURE AND COLOR ELECTROPHORETIC DISPLAY HAVING THE SAME

CROSS-REFERENCE TO RELATED APPLICATION

This application claims priority to U.S. Provisional Application Ser. No. 63/076,950, filed Sep. 11, 2020, which is herein incorporated by reference in its entirety.

BACKGROUND

Field of Invention

The present invention relates to a front plate laminate structure and a color electrophoretic display device.

Description of Related Art

The color filter layer of a color electrophoretic display device is commonly disposed above the front plate laminate structure. Therefore, total reflection and scattering may happen between the multilayer structures between the color filter layer and the display medium layer. As such, color mixing problem may occur, such that the color saturation may be reduced. In addition, the distance between the color filter layer and the display medium layer may limit the display view. When the viewing angle is large, the light entering the eyes may have color shift caused by adjacent color resists.

Accordingly, it is still a development direction for the industry to provide a color electrophoretic display device of which the distance between the color filter layer and the display medium layer is shortened.

SUMMARY

One aspect of the present disclosure is a front plate laminate structure.

In some embodiments, the front plate laminate structure includes a display medium layer, a top adhesive layer, a transparent substrate, a transparent conductive film, and a color filter layer. The top adhesive layer is located on the display medium layer. The transparent substrate is located on the top adhesive layer. The transparent conductive film is located between the transparent substrate and the top adhesive layer. The transparent conductive film includes a bottom surface facing the top adhesive layer. The color filter layer is located between the transparent substrate and the display medium layer.

In some embodiments, the color filter layer is located between the top adhesive layer and the display medium layer.

In some embodiments, the color filter layer is in contact with a top surface of the display medium layer facing the top adhesive layer.

In some embodiments, the top adhesive layer includes a first sub-layer and a second sub-layer, and the color filter layer is located between the first sub-layer and the second sub-layer.

In some embodiments, the color filter layer is located between the transparent conductive film and the top adhesive layer.

In some embodiments, the color filter layer is in contact with the bottom surface of the transparent conductive film.

In some embodiments, a surface coverage of the color filter layer is in a range of about 5% to 95%.

In some embodiments, a distance between the color filter layer and the display medium layer is in a range of about 1 um to 35 um.

In some embodiments, the color filter layer includes a plurality of color resists, the color resists are separated from each other, and a portion of the top adhesive layer is located between adjacent two color resists.

In some embodiments, each color resist includes a plurality of sections, and the sections are separated from each other.

Another aspect of the present disclosure is a color electrophoretic display device.

In some embodiments, the color electrophoretic display device includes a driving substrate and a front plate laminate structure. The front plate laminate structure is located on the driving substrate. The front plate laminate structure includes a display medium layer, a top adhesive layer, a transparent substrate, a transparent conductive film, and a color filter layer. The top adhesive layer is located on the display medium layer. The transparent substrate is located on the top adhesive layer. The transparent conductive film is located between the transparent substrate and the top adhesive layer. The transparent conductive film includes a bottom surface facing the top adhesive layer. The color filter layer is located between the transparent substrate and the display medium layer.

In some embodiments, the front plate laminate structure further includes a bottom adhesive layer located between the driving substrate and the display medium layer.

In some embodiments, the color filter layer is located between the top adhesive layer and the display medium layer, and the color filter layer is in contact with a top surface of the display medium layer facing the top adhesive layer.

In some embodiments, the top adhesive layer includes a first sub-layer and a second sub-layer, and the color filter layer is located between the first sub-layer and the second sub-layer.

In some embodiments, the color filter layer is located between the transparent conductive film and the top adhesive layer.

In some embodiments, the bottom surface of the color filter layer and the top surface of the top adhesive layer have a distance h1 therebetween, the top surface of the color filter layer and the bottom surface of the transparent conductive film have a distance h2 therebetween, and a ratio between h1 and h2 is in a range of about 0.5 to 1.

In some embodiments, the color filter layer is in contact with the bottom surface of the transparent conductive film.

In some embodiments, a surface coverage of the color filter layer is in a range of about 5% to 95%.

In some embodiments, a distance between the color filter layer and the display medium layer is in a range of about 1 um to 35 um.

In some embodiments, the color filter layer includes a plurality of color resists, the color resists are separated from each other, and a portion of the top adhesive layer is located between adjacent two color resists.

In the aforementioned embodiments, by shortening the distance between the color filter layer and the display medium layer, total reflection and scattering of light between the color filter layer and the display medium layer may be reduced. As such, color mixing problem can be reduced so as to improve the color saturation of the color electrophoretic display device and increase the viewing angle of the color electrophoretic display device. Since the surface coverage of the color filter layer is in a range of about 5% to 95%, the possibility of the light being absorbed by the color resist can be reduced and more light may be reflected by the display medium layer so as to improve the reflectivity of the color electrophoretic display device. In addition, since adjacent two color resists of the color filter layer have a distance therebetween, a portion of the top adhesive layer is located between adjacent two color resists. Such structural design may increase the overall stability of the adhesive strength between the transparent substrate, the top adhesive layer, and the display medium layer.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
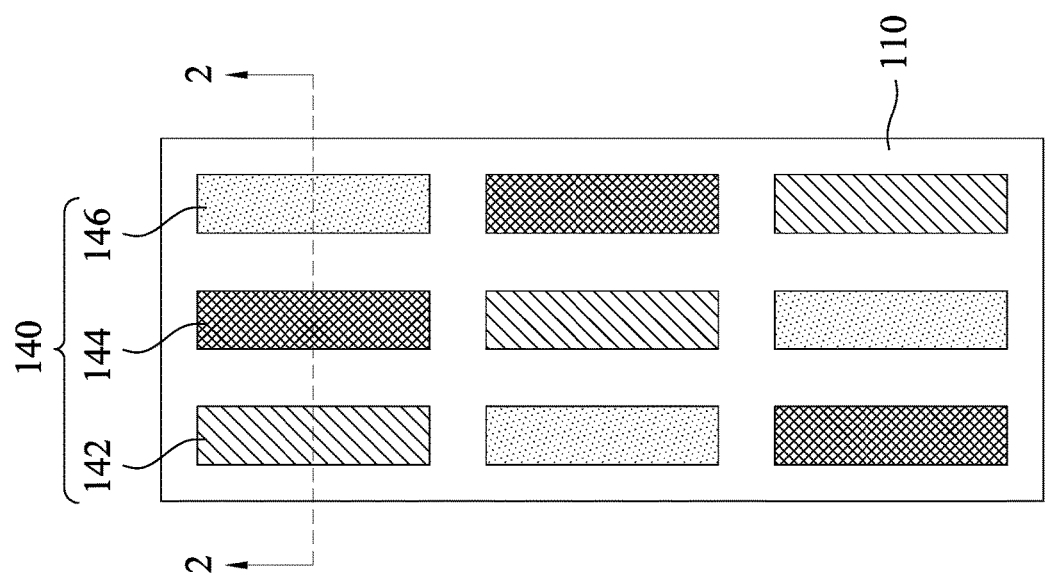
FIG. 1 is a top view of a color electrophoretic display device according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
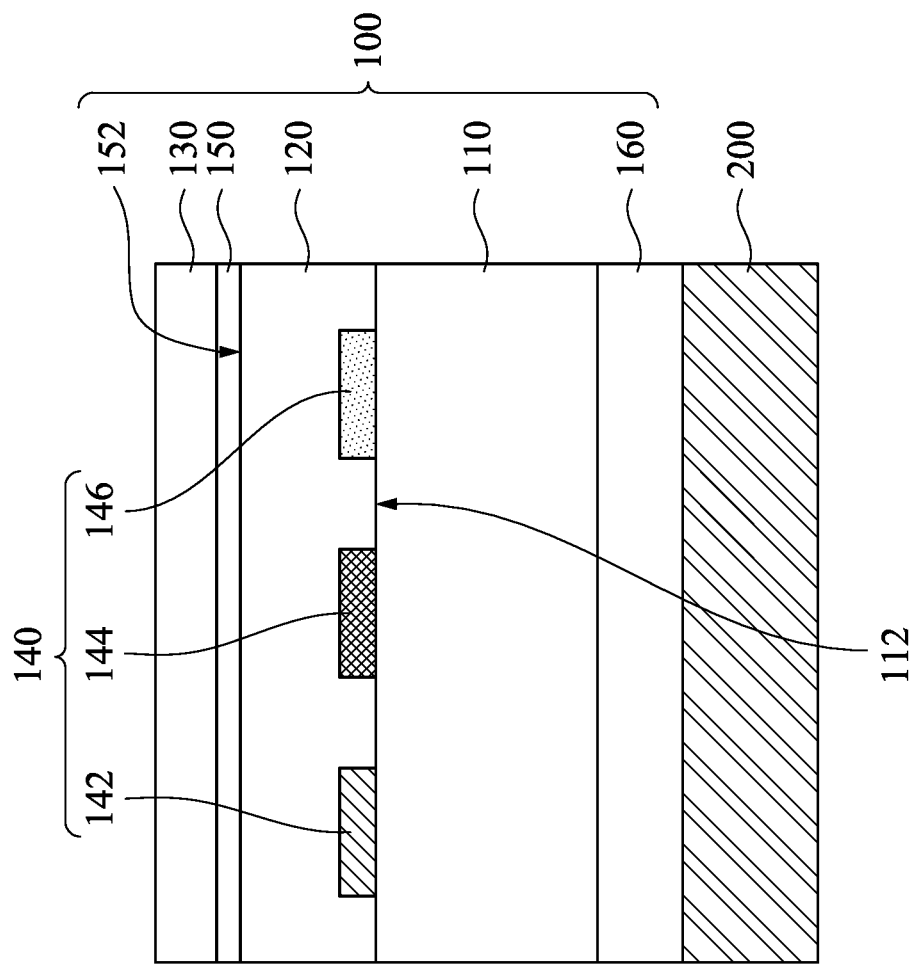
FIG. 2 is a cross-sectional view taken along the line 2-2 in FIG. 1.

FIG. 1 is a top view of a color electrophoretic display device 10 according to one embodiment of the present disclosure. FIG. 2 is a cross-sectional view taken along the line 2-2 in FIG. 1. Reference is made to FIG. 1 and FIG. 2. The color electrophoretic display device 10 includes a front plate laminate structure 100 and a driving substrate 200. The front plate laminate structure 100 is located on the driving substrate 200. The front plate laminate structure 100 includes a display medium layer 110, a top adhesive layer 120, a transparent substrate 130, a color filter layer 140, a transparent conductive film 150, and a bottom adhesive layer 160. The top adhesive layer 120 is located on the display medium layer 110. The transparent substrate 130 is located on the top adhesive layer 120. The transparent conductive film 150 is located between the transparent substrate 130 and the top adhesive layer 120. The transparent conductive film 150 has a bottom surface 152 facing the top adhesive layer 120. The display medium layer 110 has a top surface 112 facing the top adhesive layer 120. The color filter layer 140 is located between the transparent substrate 130 and the display medium layer 110. The bottom adhesive layer 160 is located between the driving substrate 200 and the display medium layer 110, and the bottom adhesive layer 160 is configured to adhesive the front plate laminate structure 100 on the driving substrate 200.

In the present embodiment, the color filter layer 140 includes multiple color resists such as a red color resist 142, a blue color resist 144, and a green color resist 146, but the present disclosure is not limited in this regard. The transparent conductive film 150 is coated on the transparent substrate 130. The transparent conductive film 150 is configured to form an electronic field with the conductive layer in the driving substrate 200 so as to control the display medium layer 110. The red color resist 142, the blue red color resist 144, and the green red color resist 146 are separated from each other. In other words, adjacent two color resists of the color filter layer 140 have a distance therebetween. In some embodiments, the surface coverage of the color filter layer 140 is in a range of about 5% to 95%. In other words, an area of the projection of the color filter layer 140 on the display medium layer 110 is about 5% to 95% of an area of the display medium layer 110. In some preferred embodiments, the surface coverage of the color filter layer 140 is in a range of about 30% to 80%. Specifically, in some other preferred embodiments, the surface coverage of the color filter layer 140 is in a range of about 40% to 70%. As such, the aforesaid configuration may reduce the possibility of the light being absorbed by the color resist, such that the reflectivity of the color electrophoretic display device 10 may be improved.

In the present embodiment, the color filter layer 140 is located between the top adhesive layer 120 and the display medium layer 110. The color filter layer 140 is in contact with the top surface 112 of the display medium layer 110. In other words, the color filter layer 140 is directly formed on the top surface 112 of the display medium layer 110, and there is no need to adhere the color filter layer 140 to the display medium layer 110 through adhesive layer. In addition, since there is a distance between adjacent two color resists of the color filter layer 140, a portion of the top adhesive layer 120 is located between adjacent two color resists. In other words, a portion of the top adhesive layer 120 is directly in contact with the top surface 112 of the display medium layer 110. Therefore, such structural configuration may increase the contact area between the top adhesive layer 120 and the display medium layer 110 so as to improve the overall stability of the adhesive strength between the top adhesive layer 120, the display medium layer 110, and the color filter layer 140.

As described above, in the present embodiment, since there is no distance between the color filter layer 140 and the display medium layer 110, total reflection and scattering of light between the color filter layer 140 and the display medium layer 110 may be reduced. As such, color mixing problem can be reduced so as to improve the color saturation of the color electrophoretic display device 10 and increase the viewing angle of the color electrophoretic display device 10. The reflectivity of the color electrophoretic display device 10 can be increased by adjusting the surface coverage of the color filter layer 140. In addition, since a portion of the top adhesive layer 120 is located between adjacent two color resists, the overall stability of the adhesive strength between the top adhesive layer 120, the display medium layer 110, and the color filter layer 140 can be improved.

Figure 3:
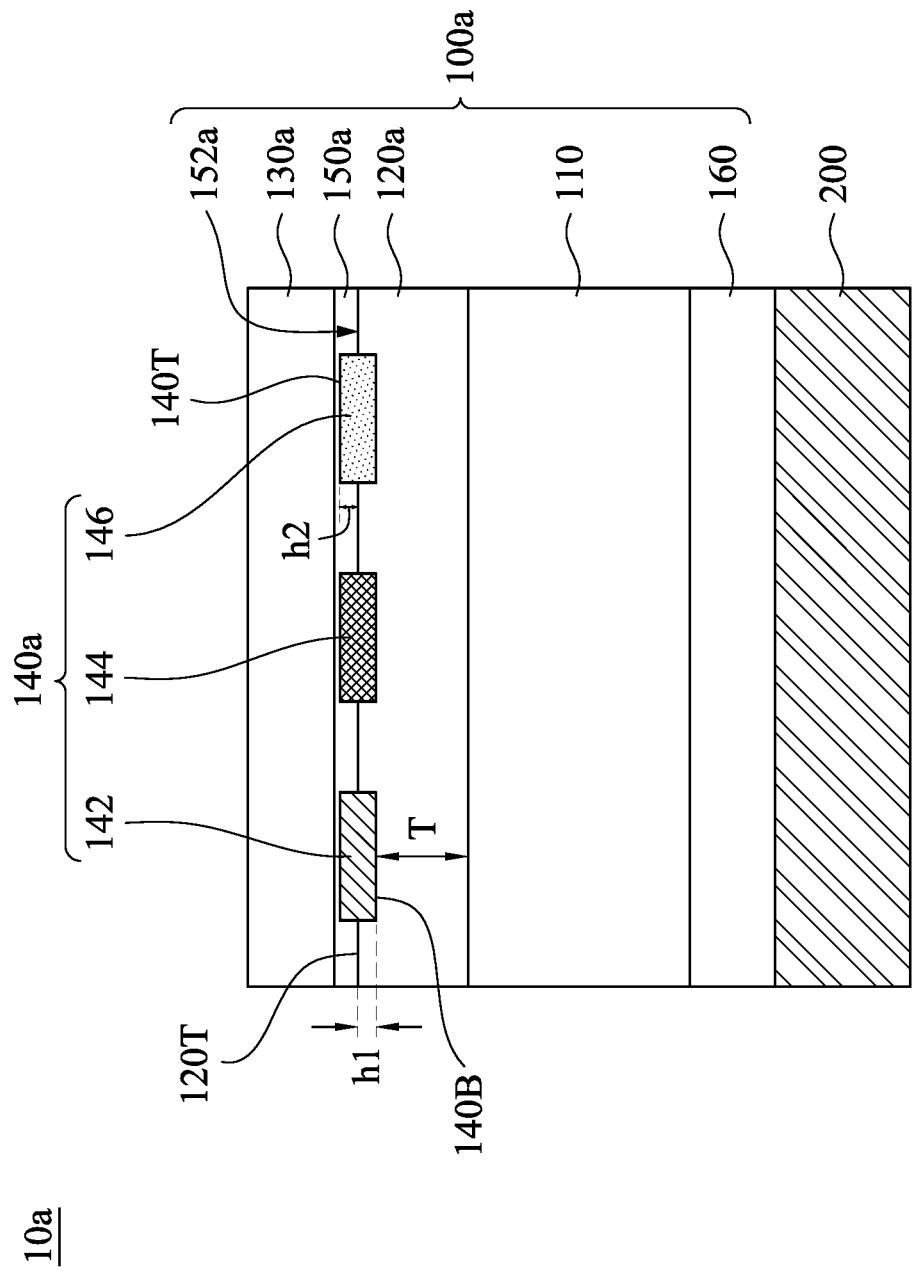
FIG. 3 is a cross-sectional view of a color electrophoretic display device according to another embodiment of the present disclosure.

FIG. 3 is a cross-sectional view of a color electrophoretic display device 10a according to another embodiment of the present disclosure. The color electrophoretic display device 10a is substantially the same as the color electrophoretic display device 10, and the difference is that the color filter layer 140a is located between the transparent conductive film 150a and the top adhesive layer 120a. The color filter layer 140a is in contact with the bottom surface 152a of the transparent conductive film 150a, that is the color filter layer 140a is in contact with the top surface of the top adhesive layer 120a. The distance T between the color filter layer 140a and the display medium layer 110 is in a range of about 1 um to 35 um. In some preferred embodiments, the distance T between the color filter layer 140a and the display medium layer 110 is in a range of about 10 um to 30 um. In some preferred embodiments, the distance T between the color filter layer 140a and the display medium layer 110 is in a range of about 15 um to 25 um.

In some embodiment, the color filter layer 140a is formed on the top adhesive layer 120a first. The bottom surface 140B of the color filter layer 140a and the top surface 120T of the top adhesive layer 120a have a distance h1, and the top adhesive layer 120a may be optical double-sided tape. The transparent substrate 130a and the transparent conductive film 150a are bonded on to the color filter layer 140a and the top adhesive layer 120a continuously, and the top surface 140T of the color filter layer 140a and the bottom surface 152a of the transparent conductive film 150a have a distance h2 therebetween. A ratio between h1 and h2 is in a range of about 0.5 to 1. Since the distance between the color filter layer 140a and the display medium layer 110 is shorter, total reflection and scattering of light between the color filter layer 140a and the display medium layer 110 may be reduced. As such, color mixing problem of the color electrophoretic display device 10a can be reduced so as to improve the color saturation of the color electrophoretic display device 10a and increase the viewing angle of the color electrophoretic display device 10a.

In the aforesaid embodiment, the top adhesive layer 120a may enhance the adhesiveness between the top adhesive layer 120a and the color filter layer 140a. In addition, since there is a distance between adjacent two color resists of the color filter layer 140a, a portion of the transparent conductive film 150a and a portion of the top adhesive layer 120a are located between the adjacent two color resists. In other words, a portion of the bottom surface 152a of the transparent conductive film 150a is directly in contact with a portion of the top adhesive layer 120. Therefore, such structural design may increase the contact area between the transparent conductive film 150a and the top adhesive layer 120a so as to improve the overall stability of the adhesive strength between the transparent conductive film 150a, the top adhesive layer 120a, the display medium layer 110, and the color filter layer 140a.

Figure 4:
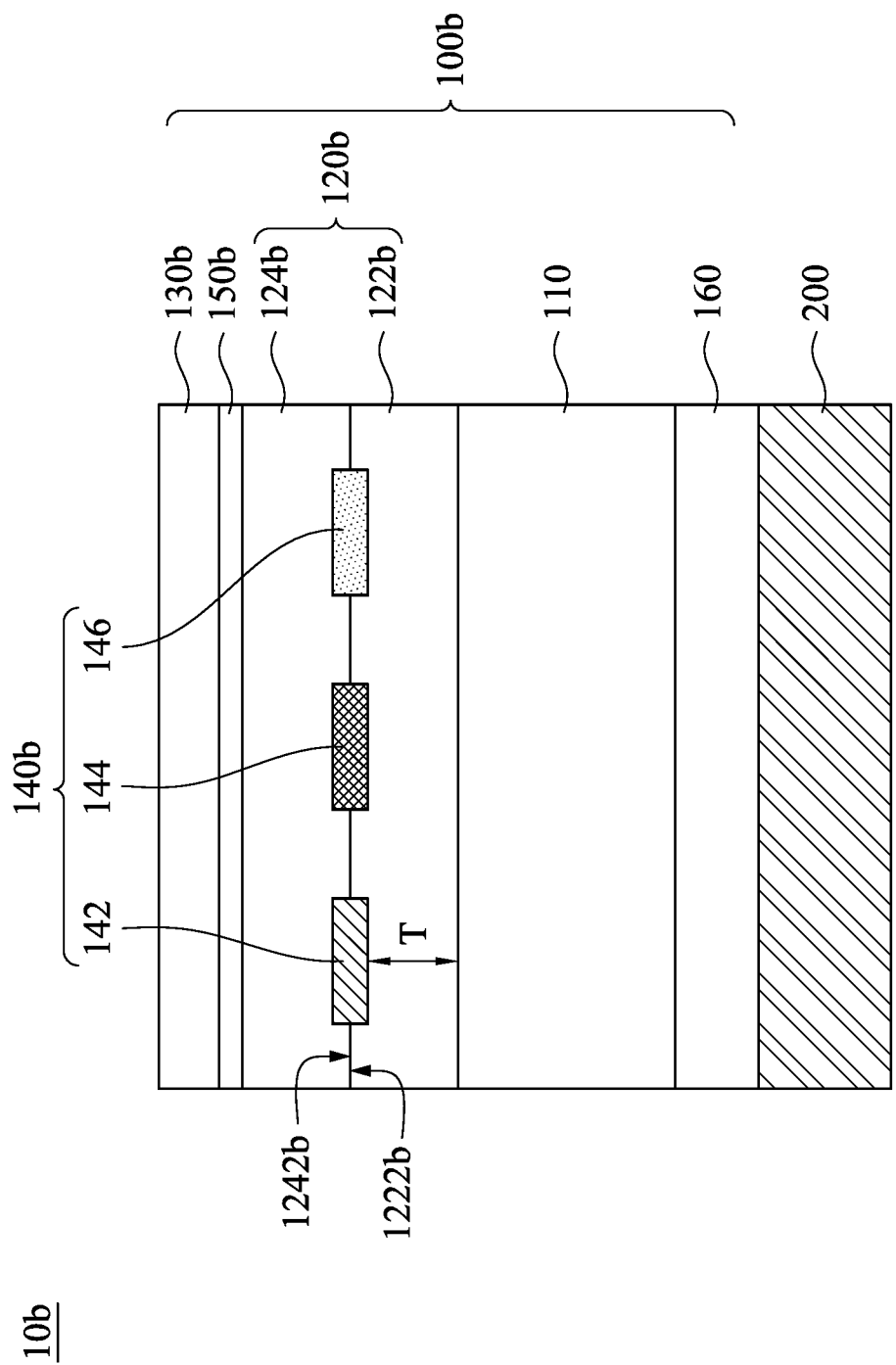
FIG. 4 is a cross-sectional view of a color electrophoretic display device according to another embodiment of the present disclosure.

FIG. 4 is a cross-sectional view of a color electrophoretic display device 10b according to another embodiment of the present disclosure. The color electrophoretic display device 10b is substantially the same as the color electrophoretic display device 10, and the difference is that the top adhesive layer 120b includes a first sub-layer 122b and a second sub-layer 124b. The color filter layer 140b is located in the top adhesive layer 120b, that is, the color filter layer 140b is located between the first sub-layer 122b and the second sub-layer 124b. The first sub-layer 122b has a top surface 1222b facing the second sub-layer 124b, and the second sub-layer 124b has a bottom surface 1242b facing the first sub-layer 122b. The color filter layer 140b is in contact with the top surface 1222b of the first sub-layer 122b and the bottom surface 1242b of the second sub-layer 124b. The distance T between the color filter layer 140a and the display medium layer 110 is substantially the same as the distance T of the color electrophoretic display device 10a, and the description is not repeated hereinafter.

In the present embodiment, since the distance between the color filter layer 140b and the display medium layer 110 is shorter, total reflection and scattering of light between the color filter layer 140b and the display medium layer 110 may be reduced. As such, color mixing problem of the color electrophoretic display device 10b can be reduced so as to improve the color saturation of the color electrophoretic display device 10b and increase the viewing angle of the color electrophoretic display device 10b.

In the present embodiment, the second sub-layer 124b may enhance the adhesiveness between the color filter layer 140b and the transparent conductive film 150a. In addition, since there is a distance between adjacent two color resists of the color filter layer 140b, a portion of the first sub-layer 122b and a portion of the second sub-layer 124b are located between the adjacent two color resists. In other words, a portion of the top surface 1222b of the first sub-layer 122b is directly in contact with the bottom surface 1242b of the second sub-layer 124b. Therefore, such structural design may increase the contact area between the first sub-layer 122b and the second sub-layer 124b so as to improve the overall stability of the adhesive strength between the transparent conductive film 150a, the top adhesive layer 120b, the display medium layer 110, and the color filter layer 140b.

Figures 5A, 5B:
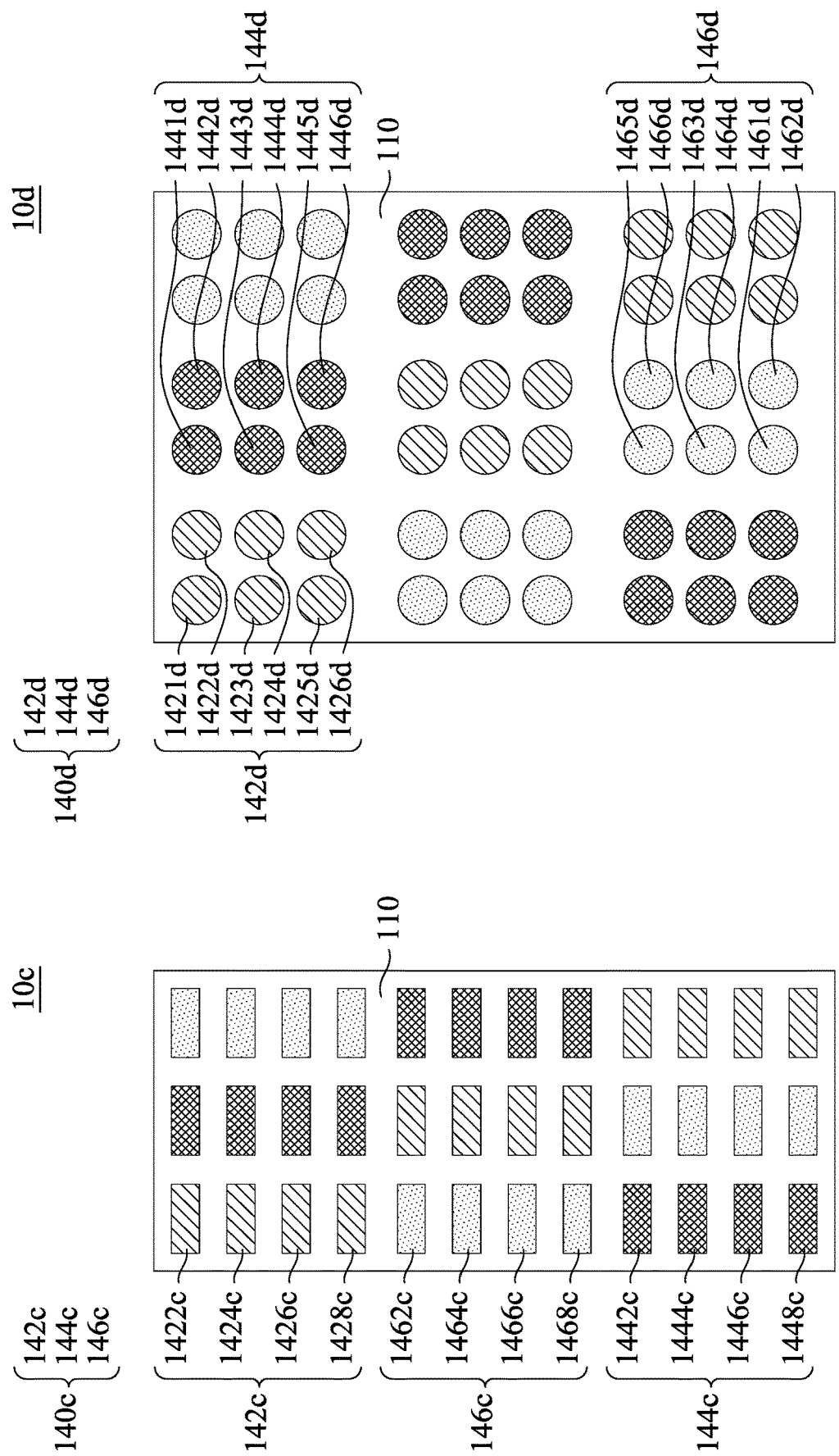
FIGS. 5A to 5D are top views of color electrophoretic display devices according to various embodiments of the present disclosure.

FIGS. 5A to 5D are top views of color electrophoretic display devices according to various embodiments of the present disclosure. As shown in FIG. 5A, in the present embodiment, the red color resists 142c of the color filter layer 140c include sections 1422c, 1424c, 1426c, 1428c that are separated from each other. The blue color resists 144c include sections 1442c, 1444c, 1446c, 1448c that are separated from each other. The green color resists 146c include sections 1462c, 1464c, 1466c, 1468c that are separated from each other. In the present embodiments, each section has rectangular shape. The long sides of each sections are parallel with each other, and the short sides of each sections form the long sides of the color resist, but the present disclosure is not limited in this regard.

As shown in FIG. 5B, in the present embodiment, the red color resists 142d of the color filter layer 140d include sections 1421d, 1422d, 1423c,1424d, 1425d, 1426d that are separated from each other. The blue color resists 144d include sections 1441d, 1442c, 1443d, 1444d, 1445d, 1446d that are separated from each other. The green color resists 146d include sections 1461d, 1462d, 1463d, 1464d, 1465d, 1466d that are separated from each other. In the present embodiments, each section has circular shape, but the present disclosure is not limited in this regard.

Figure 5D:
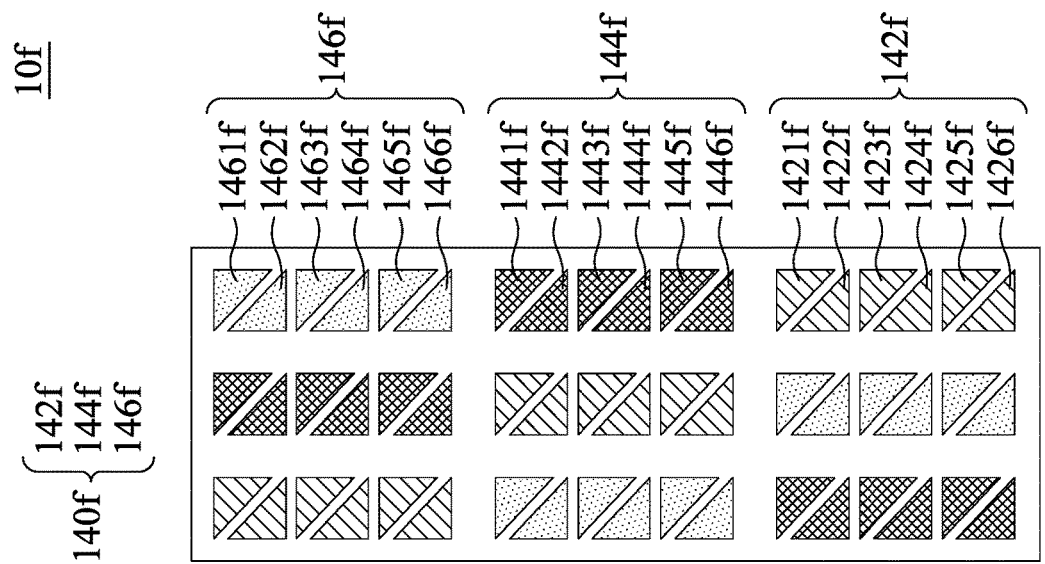
Figure 5C:
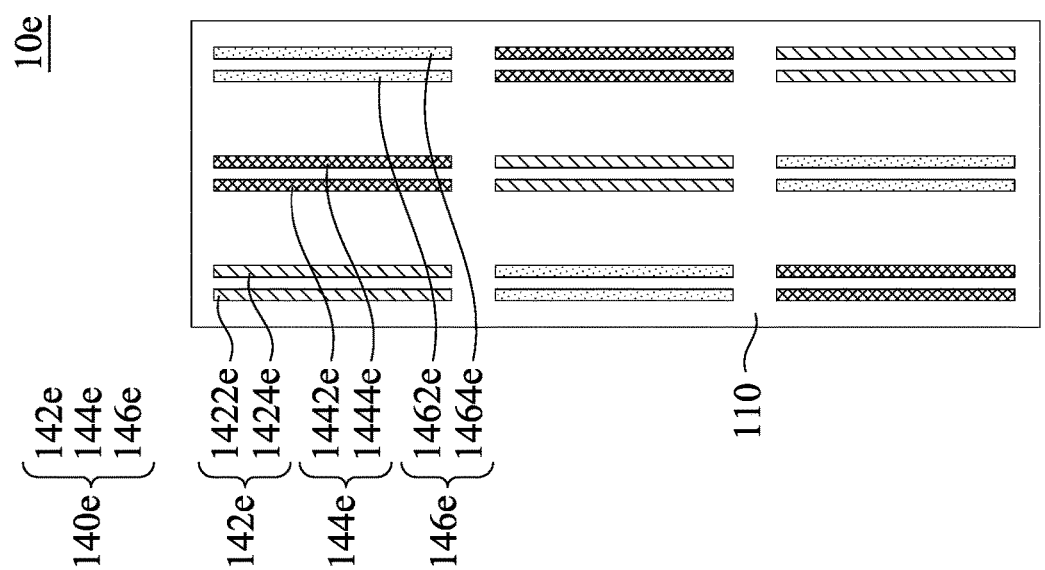

As shown in FIG. 5C, in the present embodiment, the red color resists 142e of the color filter layer 140e include sections 1422e, 1424e that are separated from each other. The blue color resists 144e include sections 1442e, 1444e that are separated from each other. The green color resists 146e include sections 1462e, 1464e that are separated from each other. In the present embodiments, the long sides of each sections are parallel with each other, and the long sides of each sections are the long sides of the color resist, but the present disclosure is not limited in this regard.

As shown in FIG. 5D, in the present embodiment, the red color resists 142f of the color filter layer 140f include sections 1421f, 1422f, 1423f,1424f, 1425f, 1426f that are separated from each other. The blue color resists 144f include sections 1441f, 1442f, 1443f, 1444f, 1445f, 1446f that are separated from each other. The green color resists 146f include sections 1461f, 1462f, 1463f, 1464f, 1465f, $1466f$ that are separated from each other. In the present embodiments, each section has triangular shape, but the present disclosure is not limited in this regard.

Figure 6:
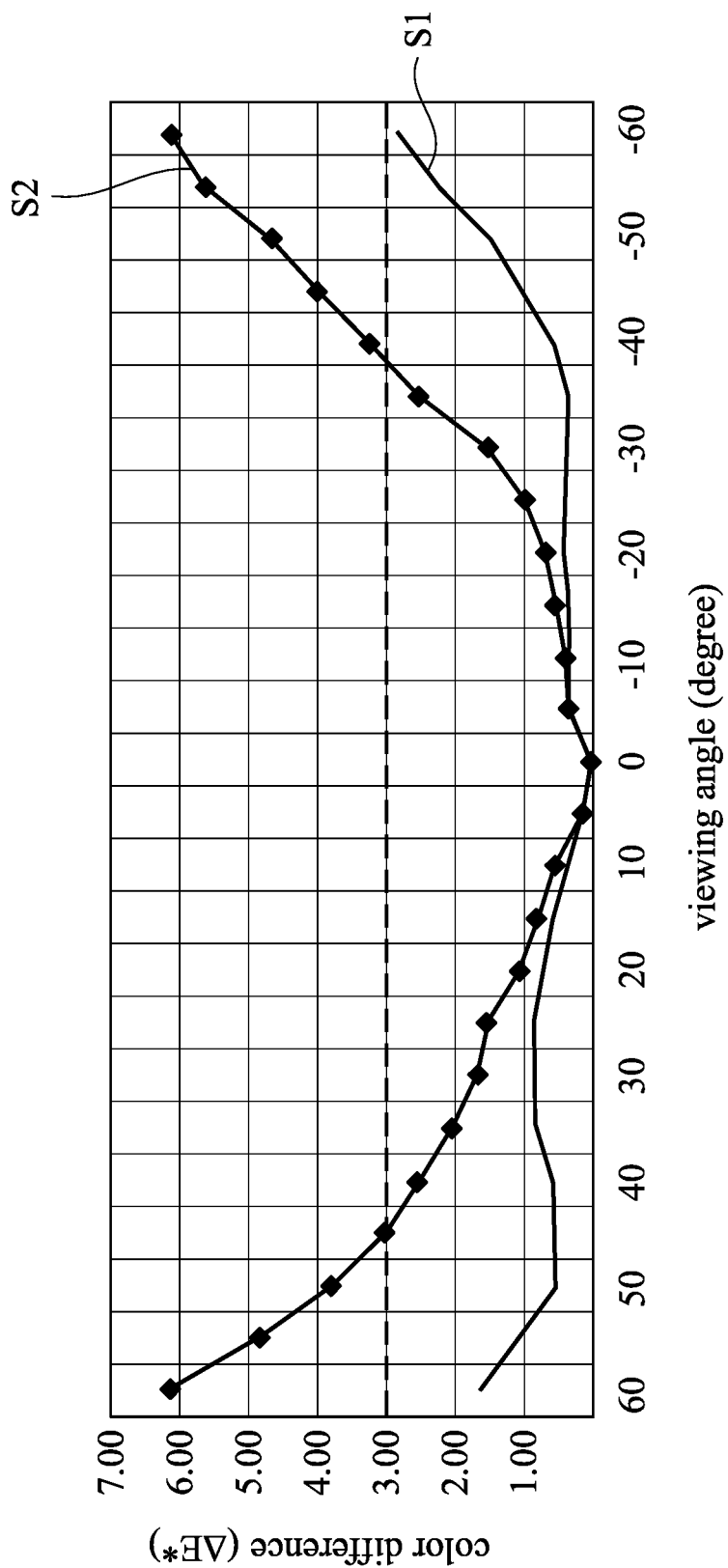
FIG. 6 is a relation plot between the viewing angle and the color difference of the color electrophoretic display device in FIG. 1.

FIG. 6 is a relation plot between the viewing angle and the color difference of the color electrophoretic display device $10a$ in FIG. 1. The curve S1 represents the relation plot between the viewing angle and the color difference of the color electrophoretic display device $10a$. The curve S2 represents the relation plot between the viewing angle and the color difference of the known color electrophoretic display device. The color difference ($\Delta E^*$) is derived from the color deviation equation based on the CIELAB color space $(L^*_1, a^*_1, b^*_1)$ and $(L^*_2, a^*_2, b^*_2)$.

$$\Delta E^*_{ab} = \sqrt{(L^*_2 - L^*_1)^2 + (a^*_2 - a^*_1)^2 + (b^*_2 - b^*_1)^2} \quad \text{Equation (1)}$$

As shown in FIG. 6, by shortening the distance between the color filter layer and the display medium layer, the color difference within a range of the viewing angle of 120 degrees of the color electrophoretic display device $10a$ can be reduced from about 6.00 (curve S2) to about 3.00 (curve S1). In other words, within the range of the viewing angle of 120 degrees, the color difference of the color electrophoretic display device $10a$ is in a range that is barely noticeable to human eyes. Accordingly, by shortening the distance between the color filter layer and the display medium layer, color mixing problem can be reduced so as to increase the viewing angle of the color electrophoretic display device $10a$.

Figure 7:
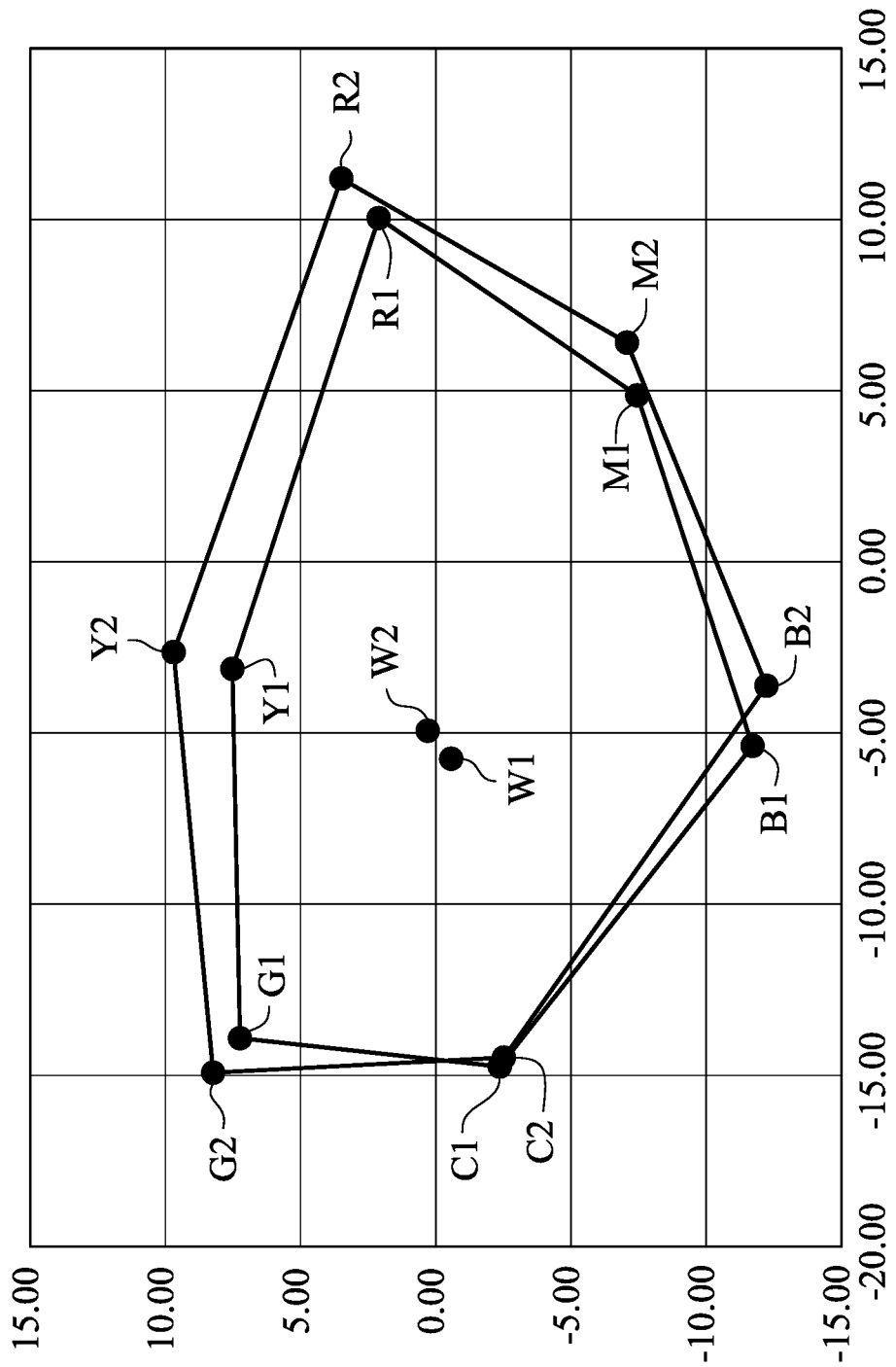
FIG. 7 is a color gamut diagram of a color electrophoretic display device according to one embodiment of the present disclosure.

FIG. 7 is a color gamut diagram of a color electrophoretic display device according to one embodiment of the present disclosure. The color gamut defined by the color coordinates R1(red), G1(green), B1(blue), C1(cyan), M1 (magenta), and Y1 (yellow) is the color range of the known color electrophoretic display device. The color gamut defined by the color coordinate R2, G2, B2, C2, M2, and Y2 is the color range of the color electrophoretic display device $10a$ as shown in FIG. 3. Comparing to the known color electrophoretic display device, the gamut value of the color electrophoretic display device $10a$ is increased from 3700 to 5700 approximately. Therefore, by shortening the distance between the color filter layer and the display medium layer, the color area of the color electrophoretic display device $10a$ can be increased. In addition, the expansion of the coordinate value (a*, b*) indicates that the color saturation of the color electrophoretic display device is increased. The coordinate values of the white color W1, W2 reveal the color balance of an electrophoretic display. It is noted that the colors in the color gamut of the color electrophoretic display device $10a$ are more balanced by comparing the white color W2 (−2.9, 0.24) of the color electrophoretic display device $10a$ and the white color W1 (−4.63, −0.22) of the known color electrophoretic display device. Note that the color measurement result of coordinate (0, 0) denotes no color difference between calibrated white state and measured object without considering the brightness ($L^*$).

As described above, by shortening the distance between the color filter layer and the display medium layer, total reflection and scattering of light between the color filter layer and the display medium layer may be reduced. As such, color mixing problem can be reduced so as to improve the color saturation of the color electrophoretic display device and increase the viewing angle of the color electrophoretic display device. Since the surface coverage of the color filter layer is in a range of about 5% to 95%, the possibility of the light being absorbed by the color resist can be reduced so as to improve the reflectivity of the color electrophoretic display device. In addition, since adjacent two color resists of the color filter layer have a distance therebetween, a portion of the top adhesive layer is located between adjacent two color resists. Such structural design may increase the overall stability of the adhesive strength between the transparent substrate, the top adhesive layer, and the display medium layer.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A front plate laminate structure, comprising:
   a display medium layer;
   a top adhesive layer located on the display medium layer;
   a transparent substrate located on the top adhesive layer;
   a transparent conductive film located between the transparent substrate and the top adhesive layer, wherein the transparent conductive film comprises a bottom surface facing the top adhesive layer; and
   a color filter layer located between the transparent substrate and the display medium layer, wherein the color filter layer is located between the transparent conductive film and the top adhesive layer, a bottom surface of the color filter layer and a top surface of the top adhesive layer have a distance h1 therebetween, a top surface of the color filter layer and the bottom surface of the transparent conductive film have a distance h2 therebetween, and a ratio between h1 and h2 is in a range of about 0.5 to 1.

2. The front plate laminate structure of claim 1, wherein the color filter layer is in contact with the bottom surface of the transparent conductive film.

3. The front plate laminate structure of claim 1, wherein a surface coverage of the color filter layer is in a range of about 5% to 95%.

4. The front plate laminate structure of claim 1, wherein a distance between the color filter layer and the display medium layer is in a range of about 1 um to 35 um.

5. The front plate laminate structure of claim 1, wherein the color filter layer comprises a plurality of color resists, the color resists are separated from each other, and a portion of the top adhesive layer is located between adjacent two color resists.

6. The front plate laminate structure of claim 5, wherein each color resist comprises a plurality of sections, and the sections are separated from each other.

7. A color electrophoretic display device, comprising:
   a driving substrate; and
   a front plate laminate structure located on the driving substrate, and
   the front plate laminate structure comprises:
   a display medium layer;
   a top adhesive layer located on the display medium layer;
   a transparent substrate located on the top adhesive layer;
   a transparent conductive film located between the transparent substrate and the top adhesive layer, wherein the transparent conductive film comprises a bottom surface facing the top adhesive layer; and a color filter layer located between the transparent substrate and the display medium layer,
wherein the color filter layer is located between the transparent conductive film and the top adhesive layer,
a bottom surface of the color filter layer and a top surface of the top adhesive layer have a distance h1 therebetween,
a top surface of the color filter layer and the bottom surface of the transparent conductive film have a distance h2 therebetween, and
a ratio between h1 and h2 is in a range of about 0.5 to 1.

8. The color electrophoretic display device of claim 7, wherein the front plate laminate structure further comprises:
a bottom adhesive layer located between the driving substrate and the display medium layer.

9. The color electrophoretic display device of claim 7, wherein the color filter layer is in contact with the bottom surface of the transparent conductive film.

10. The color electrophoretic display device of claim 7, wherein a surface coverage of the color filter layer is in a range of about 5% to 95%.

11. The color electrophoretic display device of claim 7, wherein a distance between the color filter layer and the display medium layer is in a range of about 1 um to 35 um.

12. The color electrophoretic display device of claim 7, wherein the color filter layer comprises a plurality of color resists, the color resists are separated from each other, and a portion of the top adhesive layer is located between adjacent two color resists.

* * * * *